Dec. 1, 1931.   O. C. UNKE   1,834,230
BRAKE
Filed May 23, 1928
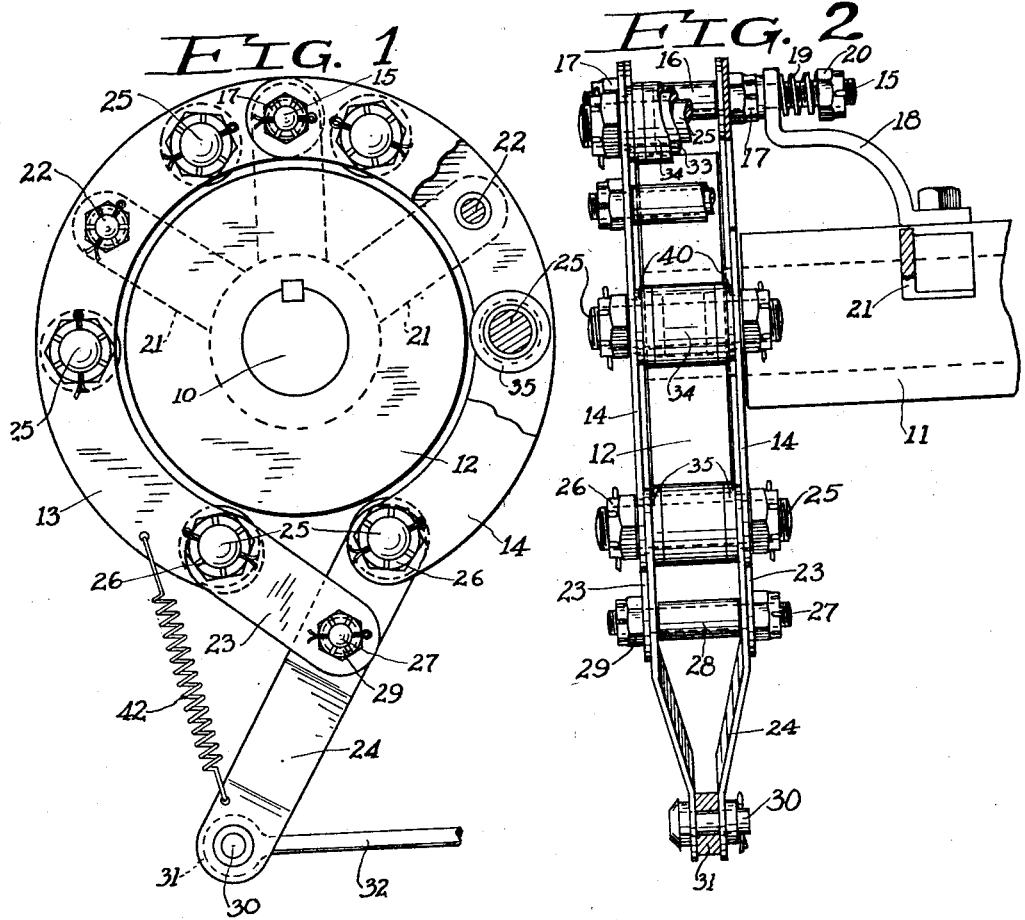
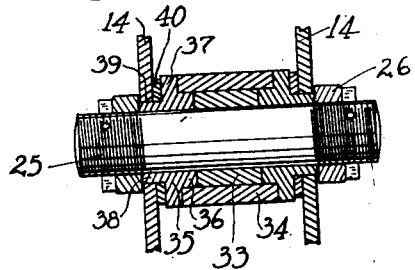

Patented Dec. 1, 1931

1,834,230

UNITED STATES PATENT OFFICE

OTTO C. UNKE, OF MILWAUKEE, WISCONSIN

BRAKE

Application filed May 23, 1928. Serial No. 280,031.

The invention relates to brakes and has for an object the provision of a brake in which a plurality of rotary braking devices are engageable with a drum for stopping or retarding the rotation of the drum, or for locking the drum against rotation.

Another object of the invention is to provide a rotary braking device including a plurality of concentrically arranged relatively rotatable members forming a multiplicity of bearing surfaces between them, the outermost of the members being engageable with the drum.

A further object is to arrange the relatively rotatable members in such manner that the application of axial thrust on these members will bring them to end thrust engagement.

A further object is to provide a brake in which a plurality of rotatable drum-engaging devices are mounted in spaced relation on a pair of bridging links displaceable to effect the engagement of the rotary devices with the drum.

A further object is to provide two pairs of bridging links hingedly connected together and disposed at opposite sides of the drum for displacement in opposite directions to effect the engagement of the rotary devices with the drum.

The invention further consists in the several features hereinafter set forth and more particularly defined by the annexed claims.

In the accompanying drawings,

Fig. 1 is a side elevation of a brake embodying the invention, parts being broken away and parts being shown in section;

Fig. 2 is another elevation thereof, parts being broken away and parts being shown in section, and Fig. 3 is a detail sectional view through one of the rotary braking devices.

In these drawings, the numeral 10 designates a rotatable shaft which may, if desired, be an axle shaft or a drive shaft of a motor vehicle. The shaft 10 is rotatably mounted in any suitable support, such as a bearing member 11, and a brake drum 12 is fixedly secured to the shaft for rotation therewith.

Two pairs of arcuate links 13 and 14 are arranged at opposite sides of the brake drum 12 to partially surround the drum and are pivotally connected together by a hinge pin 15. The links at each side of the drum are arranged in spaced substantially parallel relation, and a tubular spacer 16 is placed on the hinge pin between the links. Castellated nuts 17 are threaded on the hinge pin 15 and serve to retain the links 13 and 14 in place.

A slightly resilient bracket 18 is secured to the bearing member 11 and includes a free end portion receiving therethrough an extended end portion of the hinge pin 15. A coiled spring 19 is placed about the hinge pin to engage the bracket to retain the hinge pin against relative axial movement on the bracket against rattling, and a castellated nut 20 is threaded on the hinge pin to retain the spring under compression. If desired, additional brackets 21 similar to the bracket 18 may be placed on opposite sides of the bracket 18 in spaced relation thereto and these are suitably attached to the links 13 and 14, as by means of pivot pins 22 secured on the links in a manner similar to that employed for the hinge pin 15. The brackets 18 and 21 serve to retain the links 13 and 14 in spaced relation about the drum 12 and are preferably arranged at the upper side of the drum.

The lower ends of the links 13 are pivotally connected by short laterally spaced links 23 to the intermediate portions of levers 24, the upper ends of which are pivotally secured to the lower end portions of the links 14. For this connection the lower ends of the links 13 and 14 carry transversely extending studs 25, on which the apertured end portions of the links 23 and the levers 24 are pivotally mounted, and the opposite ends of each stud 25 are threaded to receive castellated nuts 26 retaining the links and levers in place. For the pivotal connection between the links 23 and the levers 24 there is provided a pin 27, which extends transversely of the apertured end portions of the links 23 and the apertured intermediate portions of the levers 24, a tubular spacer 28 being carried on the pin between the levers, and opposite ends of the pin 27 being threaded to receive castellated retaining nuts 29. The lower end of the levers 24 converge toward each other and carry at their spaced lower ends a transversely extending pin 30 on which is pivotally mounted the eyed end 31 of an actuating rod 32.

The links 13 and 14, in addition to the transversely extending studs 25 at their lower ends, are provided with other identical studs 25 in the same relation spaced upwardly therefrom. There are a plurality of spaced studs on each pair of links 13 and 14 and, in the present instance, three studs are provided, two of which are placed near opposite end portions of the links and the third at an intermediate portion, these being spaced approximately equal distances apart. Each stud 25 has a metal bushing 33 rotatably mounted thereon at a central portion and this latter bushing is in turn surrounded by an outer bushing 34 of greater length. Other bushings 35 are rotatably mounted on the stud 25 at opposite ends of the bushing 33 and each is provided with a shouldered portion 36 of the same diameter as the bushing 33 and having rotatably mounted thereon the end portions of the bushings 34. Each bushing 35 is provided with a flanged portion 37 of the same outer diameter as the bushing 34, and the inner face of the flange 37 lies adjacent an end of the bushing 34, while the inner face of the shouldered portion 36 lies adjacent an end of the bushing 33. An outwardly extending shouldered portion 38 is also provided on this bushing 35 and this shouldered portion is rotatably mounted in a bore 39 formed in the adjacent link 13 or 14. Washers 40 may be interposed between the flange 37 of the bushing 35 and the adjacent link 13 or 14.

The opposite ends of each stud 25 are threaded and receive thereon the castellated nuts 26, which serve to retain the bushing or roller assembly in place on the supporting links. The outer surface of the bushing 34 is substantially cylindrical and, if desired, it may be very slightly crowned.

The bushings 34 and 35 are adapted for engagement with the surface of the drum 12 and such engagement is effected by contracting the bridging links 13 and 14 about the drum. This contraction of the bridging links is produced by the levers 24 and links 23, the levers 24 being displaced by the actuating or pull rod 32 and the displacement of the levers causing the approach of the lower ends of the bridging links. The engagement of the lowermost bushing assemblies or rotary devices with the drum in turn displaces the upper portions of the bridging links downwardly and inwardly so that eventually all the outermost bushings or rollers engage the drum. This displacement of the upper portions of the links 13 and 14 is permitted by the yielding brackets 18 and 21. The rotation of the drum effects the rotation of the engaging bushings 34 and 35 of the bushing assemblies and these, in turn, by reason of the relatively large bearing surface between their relatively rotatable constituent parts, exert a retarding force which will slow down or stop the rotation of the drum according to the degree of pressure applied to the levers 24. The bridging links 13 and 14 are preferably slightly resilient and the slight lateral deflection to which these are subjected by bending stress during their contraction about the drum causes them to bear laterally against the outermost members of each bushing assembly, thereby impressing an axial thrust acting along each stud 25 and urging the several bushings into end thrust engagement to further increase the retarding force within the bushing assembly. The outermost bushings of the bushing assemblies initially engage the drum smoothly and as the contracting pressure is increased their retarding action gradually and smoothly increases so that the drum is gradually slowed down or stopped in its rotation without jerking or chattering.

If the brake is applied while the drum is rotating clockwise, as viewed in Fig. 1, the braking torque is taken largely by the levers 24 and the connected operating rod 32, thus relieving the brackets 18 and 21 of part of such torque.

In order to promptly expand the links 13 and 14 when braking pressure is to be released a tensioned coiled spring 42 is connected between the lower end portions of the levers 24 and the lower portions of the bridging links 13, and during such release the resilient brackets 18 and 21 retract the upper bushing assemblies out of contact with the drum.

While the brake of this invention is more particularly intended as an external contracting brake, it will be obvious that it may be also arranged as an internal expanding brake.

What I claim as new and desire to secure by Letters Patent is:

1. In a brake, the combination of a brake drum, pivotally connected link frames arranged about said drum and each including spaced laterally resilient side members, rotary braking members mounted between said resilient side members and engageable with the drum upon the contraction of said link frames about the drum, and means disposed at the free ends of said link frames for contracting said link frames about the drum, said resilient side members being laterally deflected by bending stress during braking to impress end thrust upon said rotary braking members.

2. In a brake, the combination of a brake drum, a frame including a pair of laterally spaced members arranged adjacent said brake drum, supporting means for said frame, means for displacing said frame with respect to the axis of the drum, a braking device mounted on said frame and including a shaft extending transversely between said members of said frame, a pair of spaced shouldered bushings mounted on said shaft, and a cylindrical bushing surrounding said shaft and supported at its end portions on said shouldered bushings.

In testimony whereof, I affix my signature.

OTTO C. UNKE.